United States Patent
Sutherland

(12) 
(10) Patent No.: US 6,253,190 B1
(45) Date of Patent: Jun. 26, 2001

(54) PROGRAMMABLE SHELF TAG AND METHOD FOR CHANGING AND UPDATING SHELF TAG INFORMATION

(75) Inventor: Jeffrey W. Sutherland, Akron, OH (US)

(73) Assignee: Telxon Corporation, Akron, OH (US)

(*) Notice: Subject to any disclaimer, the term of this patent is extended or adjusted under 35 U.S.C. 154(b) by 0 days.

(21) Appl. No.: 09/026,826

(22) Filed: Feb. 20, 1998

Related U.S. Application Data

(63) Continuation of application No. 08/430,350, filed on Apr. 28, 1995, now Pat. No. 5,751,257.

(51) Int. Cl.[7] ..................................................... G06F 17/60
(52) U.S. Cl. ............................................ 705/20; 235/383
(58) Field of Search ................................. 705/20–22, 28, 705/29; 235/383

(56) References Cited

U.S. PATENT DOCUMENTS

| | | | |
|---|---|---|---|
| 4,002,886 | * | 1/1977 | Sundelin ........................ 235/61.7 R |
| 4,291,304 | | 9/1981 | Walter ................................... 340/715 |
| 4,500,880 | * | 2/1985 | Gomersall et al. ............. 340/825.35 |
| 4,766,295 | * | 8/1988 | Davis et al. .......................... 235/383 |
| 4,870,398 | | 9/1989 | Bos . |
| 4,901,066 | | 2/1990 | Kobayashi et al. . |
| 4,908,613 | | 3/1990 | Green . |
| 4,916,441 | | 4/1990 | Gombrich . |
| 4,948,232 | | 8/1990 | Lange .................................... 350/334 |
| 5,019,811 | * | 5/1991 | Olsson et al. ................... 340/825.17 |
| 5,111,196 | * | 5/1992 | Hunt ................................ 340/825.35 |
| 5,172,314 | * | 12/1992 | Poland et al. ........................ 364/401 |
| 5,216,233 | * | 6/1993 | Main et al. ........................... 235/472 |
| 5,241,467 | * | 8/1993 | Failing et al. ....................... 364/401 |
| 5,245,534 | * | 9/1993 | Waterhouse et al. ................ 364/404 |
| 5,250,789 | | 10/1993 | Johnsen . |
| 5,251,048 | | 10/1993 | Doane et al. . |

(List continued on next page.)

FOREIGN PATENT DOCUMENTS

| | | |
|---|---|---|
| WO 94/11832 | 5/1994 | (WO) . |
| WO 95/25300 | 9/1995 | (WO) . |
| WO 00/26719 | * 5/2000 | (WO) . |
| WO 00/67110 | * 11/2000 | (WO) . |

OTHER PUBLICATIONS

"How Liquid Crystal Displays (LCDs) Work" [Retrieved from http://www.howstuffworks.com/lcd.htm on Jan. 11, 2001].*

Kent State University web page about "Liquid Crystals" [Retrieved from http://www.techtrans.kent.edu/html/technologies/lci.htm on Jan. 11, 2001], Copyright 1998.*

Zoller et al., "Bistable Liquid Crystal For High–Resolution Display Application," Lasers and Electro–Optics Europe, 1994 Conference, p. 345, Aug. 1994.*

(List continued on next page.)

Primary Examiner—Eric W. Stamber
Assistant Examiner—Susanna Meinecke-Diaz
(74) Attorney, Agent, or Firm—Renner, Otto, Boisselle & Sklar, LLP

(57) ABSTRACT

A shelf tag comprising a liquid crystal display having optical states which are stable without power and an interface that allows for each character element to be programmed easily by sweeping a programming device across the character element contacts with all power and signal requirements being supplied to the shelf tag by the programming device. The programming device can be integrated with a portable transaction computer equipped with a bar code reader or can be embodied in a stand-alone apparatus capable of receiving user input, displaying information and interfacing to the shelf tags. A method of using the shelf tags, the programming device and a radio frequency computer local area network are presented which automates many typical business applications such as inventory updating and simultaneously changing prices advertised on the shelf tags.

39 Claims, 8 Drawing Sheets

U.S. PATENT DOCUMENTS

| | | | |
|---|---|---|---|
| 5,295,064 | 3/1994 | Malec et al. . | |
| 5,296,953 | 3/1994 | Kanbe et al. . | |
| 5,298,476 * | 3/1994 | Hotta et al. | 503/201 |
| 5,313,569 * | 5/1994 | Olsson et al. | 395/118 |
| 5,374,815 * | 12/1994 | Waterhouse et al. | 235/383 |
| 5,380,991 | 1/1995 | Valencia et al. | 235/383 |
| 5,448,046 * | 9/1995 | Swartz | 235/432 |
| 5,448,226 * | 9/1995 | Failing, Jr. et al. | 340/825.35 |
| 5,457,307 * | 10/1995 | Dumont | 235/383 |
| 5,461,561 * | 10/1995 | Ackerman et al. | 364/401 |
| 5,465,085 * | 11/1995 | Caldwell et al. | 340/825.35 |
| 5,473,146 | 12/1995 | Goodwin, III | 235/383 |
| 5,506,600 | 4/1996 | Ooki et al. . | |
| 5,532,465 * | 7/1996 | Waterhouse et al. | 235/383 |
| 5,570,216 | 10/1996 | Lu et al. | 359/101 |
| 5,583,487 * | 12/1996 | Ackerman et al. | 340/825.35 |
| 5,587,264 * | 12/1996 | Lijima et al. | 430/57 |
| 5,645,758 * | 7/1997 | Kawasumi et al. | 252/299.01 |
| 5,704,049 * | 12/1997 | Briechle | 395/326 |
| 5,729,695 | 3/1998 | Ahlm et al. . | |
| 5,729,696 | 3/1998 | Goodwin, III et al. . | |
| 5,736,967 | 4/1998 | Kayser et al. . | |
| 5,751,257 * | 5/1998 | Sutherland | 345/2 |
| 5,758,064 | 5/1998 | Zimmerman et al. . | |
| 5,771,005 | 6/1998 | Goodwin, III . | |
| 5,794,211 | 8/1998 | Goodwin, III et al. . | |
| 5,794,215 | 8/1998 | Goodwin, III . | |
| 5,797,132 | 8/1998 | Altwasser . | |
| 5,812,985 * | 9/1998 | Failing et al. | 705/5 |
| 5,839,116 | 11/1998 | Goodwin, III . | |
| 5,870,714 | 2/1999 | Shetty et al. . | |
| 5,918,212 | 6/1999 | Goodwin, III . | |
| 5,926,797 | 7/1999 | Goodwin, III . | |
| 5,929,770 | 7/1999 | Faita . | |
| 5,987,426 | 11/1999 | Goodwin, III . | |
| 5,988,498 | 11/1999 | Hoell . | |
| 5,999,913 | 12/1999 | Goodwin, III . | |
| 6,009,538 | 12/1999 | Goodwin, III et al. . | |
| 6,012,040 | 1/2000 | Goodwin, III . | |
| 6,016,481 * | 1/2000 | Failing, Jr. et al. | 705/28 |
| 6,026,373 | 2/2000 | Goodwin, III . | |

OTHER PUBLICATIONS

Yang et al., "Control of Reflectivity and Bistability in Displays Using Cholesteric Liquid Crystals," Journal of Applied Physics, vol. 76, No. 2, pp. 1331–1333, Jul. 1994.*

Yang et al., "Cholesteric Liquid Crystals/Polymer Gel Dispersion Bistable at Zero Field," Display Research Conference, Oct. 1991, pp. 49–52.*

Information about ZBD Display Technology [Retrieved from http://www.zdbdisplays.com on Jan. 11, 2001], Product first demonstrated in 1997, Web site last updated on Jul. 27, 2000.*

"Riding the Air Waves," Progressive Grocer, vol. 73, No. 7, p. 104+ Jul. 1994.*

Nannery, Matt, "Giant Food Plans to Test Rival Labeling Systems," Supermarket News, vol. 43, No. 28, p. 13(1), Jul. 1993.*

Booker, Ellis, "Wal–Mart Deploys Handheld Computers," Computerworld, vol. 26, No. 42, p. 68(1), Oct. 1992.*

"Electronic Price Labels Add Accuracy, May Boom in '90s," Drug Store News, vol. 0, No. 0, p. 8, Oct. 1990.*

Francett, Barbara, "I–S in Transition: How Grocers Bag Shoppers," vol. 21, No. 4, p. 44(4), Apr. 1989.*

* cited by examiner

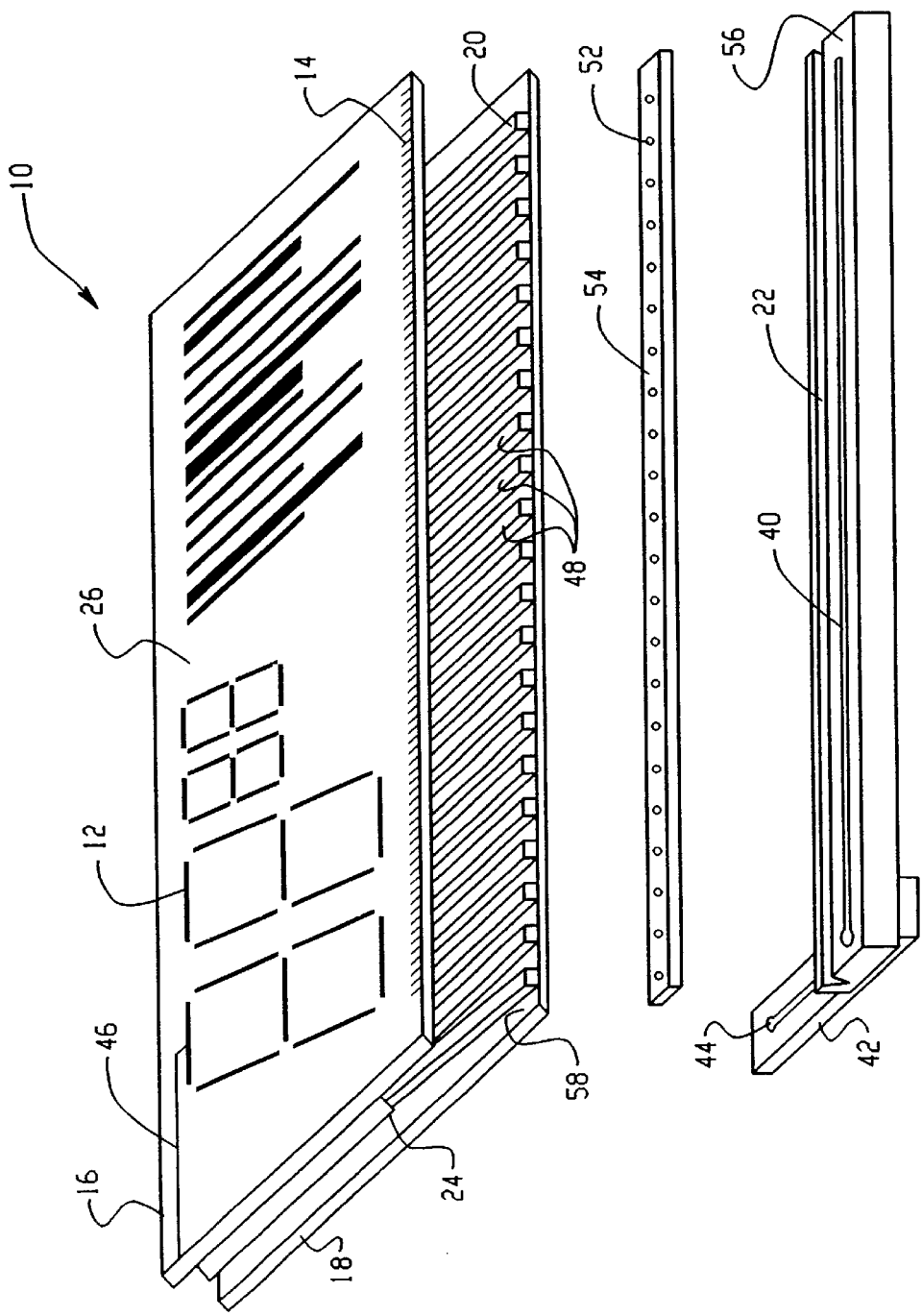

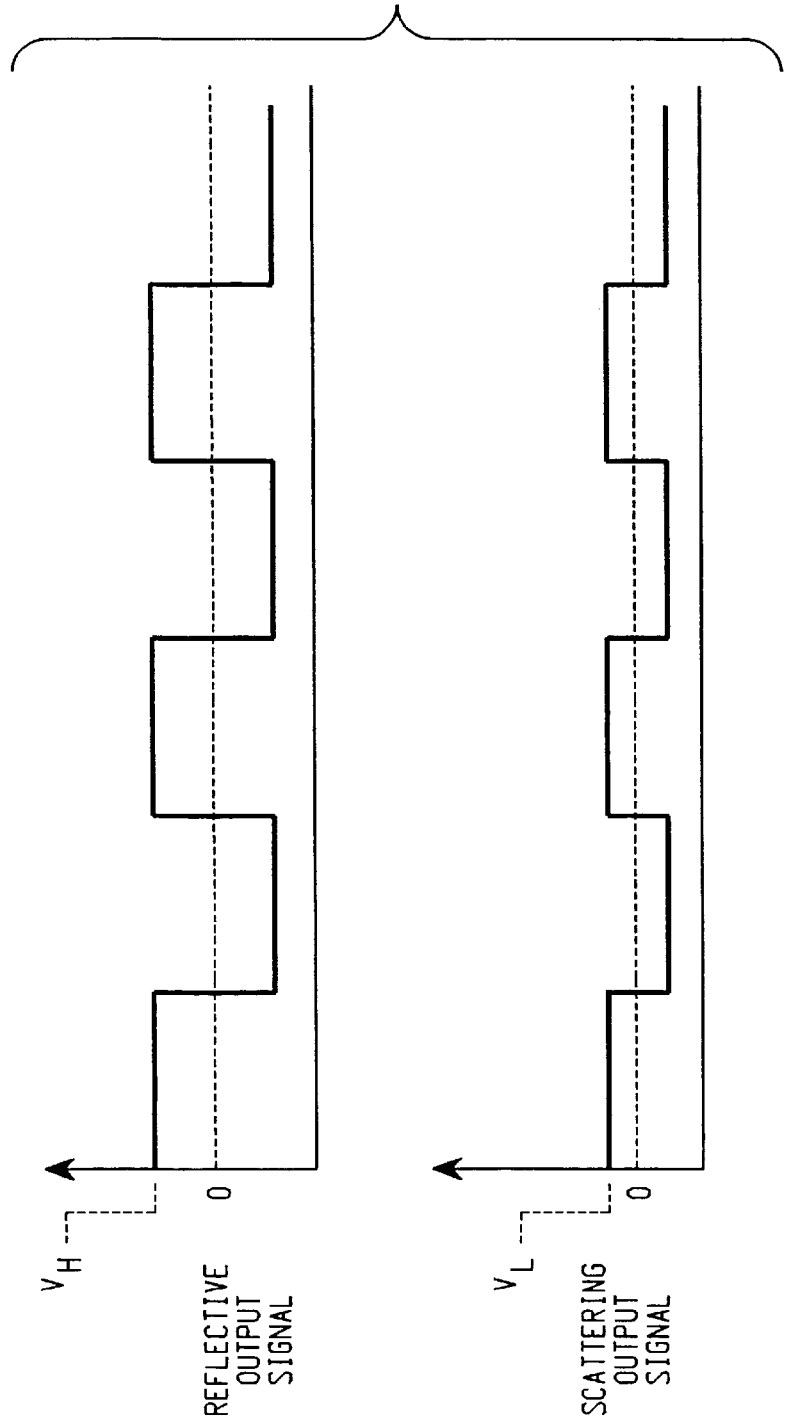

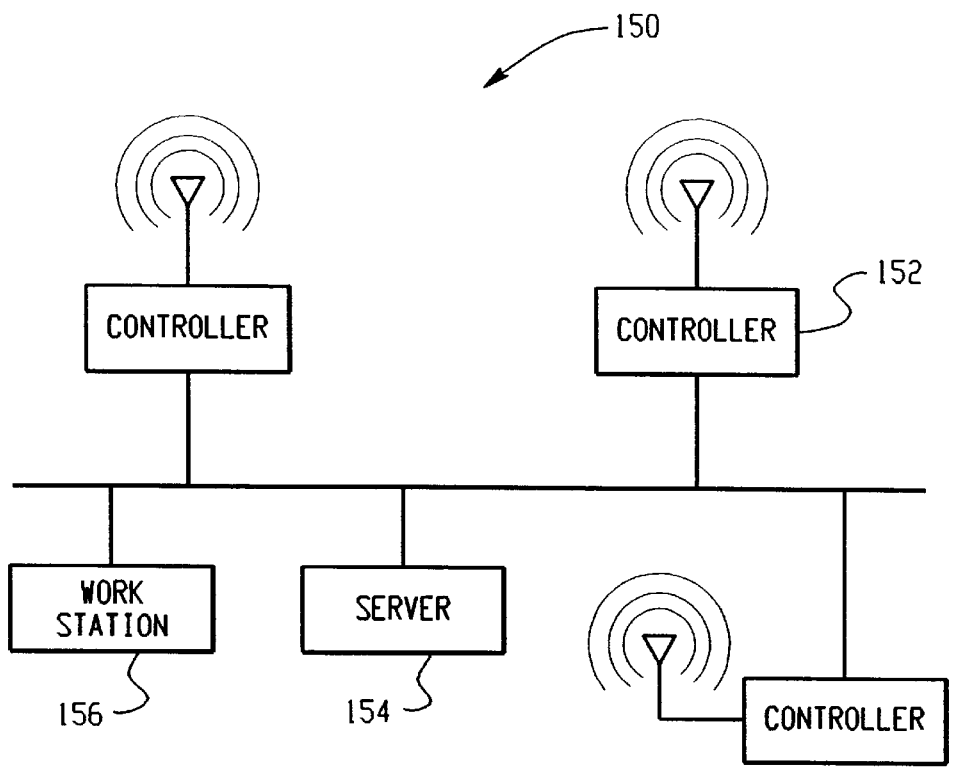
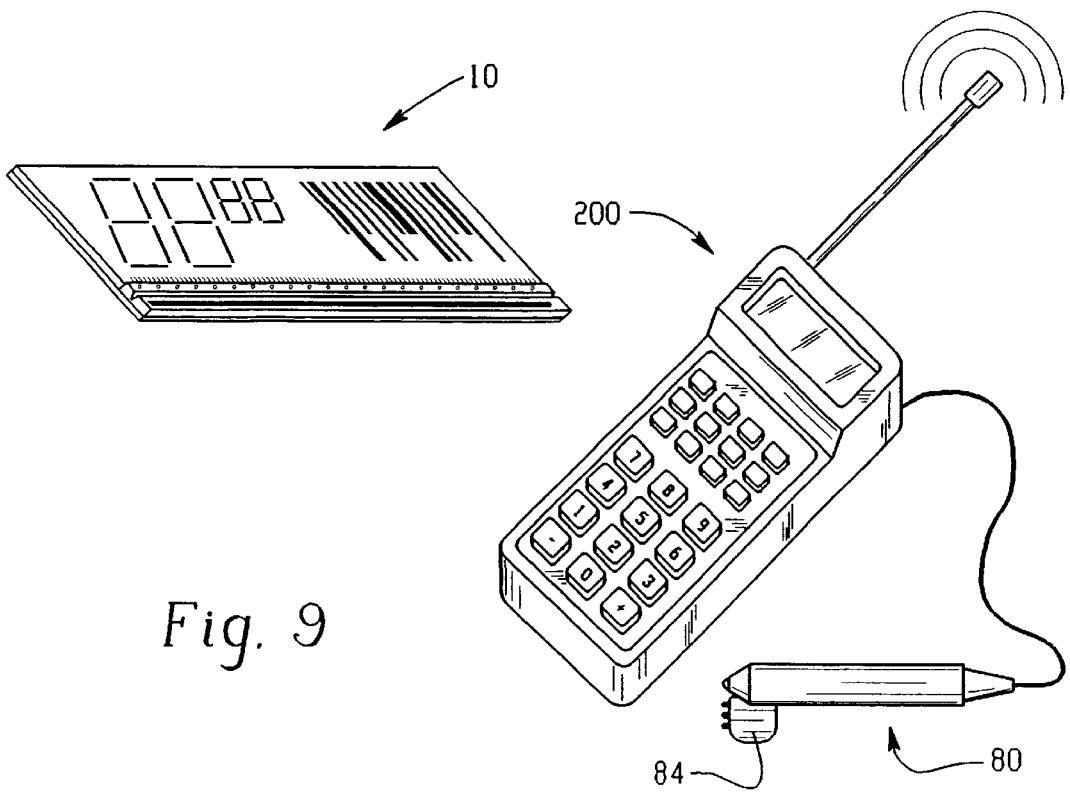
Fig. 9

PROGRAMMABLE SHELF TAG AND METHOD FOR CHANGING AND UPDATING SHELF TAG INFORMATION

This application is a continuation of application Ser. No. 08/430,350, filed Apr. 28, 1995, now U.S. Pat. No. 5,751,257.

TECHNICAL FIELD

This invention relates to the electronic display of information on a shelf tag, and more particularly to an electronic shelf tag that does not require additional circuitry or power to maintain the information displayed. More specifically, this invention relates to a programmable shelf tag along with an apparatus and method for programming the shelf tag and incorporating the information into a computer system for purposes such as inventory control.

BACKGROUND OF THE INVENTION

Shelf tags have been used for many years to display pricing information in association with the shelving on which various products are displayed for purchase. Along with pricing information, shelf tags may include additional information including bar codes representing a product on the shelf which can be used for inventory control, as well as product information or additional material. Such shelf tags have conventionally been simply constructed of a paper material on which pricing and product information is printed, which can then be placed directly on the shelving adjacent the product to which it pertains. Shelving associated with the display of product in supermarkets and other retail stores have been designed to accommodate shelf tags, with these types of shelf tags placed within a flexible plastic casing which can be snap fit onto a shelf at an appropriate position. The plastic case allows the shelf tag to be easily removed and replaced to update pricing or other information when needed.

Although serving the desired purpose, these types of shelf tags are somewhat cumbersome in use, in that updating of the pricing information requires physical removal and replacement of the shelf tag, which for retail environments becomes time consuming and expensive. Further, updating of pricing or other information on the shelf tag requires complete replacement, necessitating continuous repurchasing of new shelf tags with properly printed updated information thereon. These characteristics of the shelf tag also result in a risk that pricing or other information is not updated accurately or the shelf tags are not replaced properly.

The above problems with common shelf tags have led to the development of electronic shelf tags. Current electronic shelf tags implement the simple function of displaying information, such as a goods price, in a complicated and expensive manner. Known electronic shelf tags require an electronic display such as a liquid crystal display (LCD), display driver circuitry, programming interface circuitry, an independent power source, and other miscellaneous control circuitry to accomplish this simple function. One major drawback to the prior art devices is that the shelf tag must continuously be supplied with power to maintain its display. The power necessary to maintain the display has thus limited the amount of information which can be reasonable displayed and requires frequent replacement of a battery power supply. Also the addressing schemes used to write information onto typical LCD displays requires many connections making it necessary to incorporate the interface and driver circuitry directly into the shelf tag. Additionally, due to the sensitive nature of electronics to environmental conditions and LCD displays typically being made with glass, the known shelf tags are fragile and can be easily damaged by unconcerned shoppers or others unaware of the devices frail structure.

Also, to program and change the information displayed in known electronic shelf tags, a fixed connection between the shelf tag and the programming device must be maintained which is inconvenient and time consuming for persons assigned to change the information. Additionally, the shelf tags would require additional memory circuitry in order for a programming device to monitor the current value being displayed before writing new information over it. This function would be critical to an inventory control system.

Further to the above deficiencies of known electronic shelf tags, a main problem is associated with their cost. With all of the necessary additional circuitry and constant power requirements, current electronic shelf tags are prohibitively expensive, particularly for large -stores that would require hundreds of tags from using the electronic shelf tags in place of standard paper shelf tags.

SUMMARY OF THE INVENTION

Based upon the foregoing deficiencies in the prior art, it is an object of the present invention to provide an inexpensive, nonvolatile electronic shelf tag that requires no additional circuitry and no power source to maintain its display of information. The invention provides an electronic shelf tag that is easily programmable and can display a variety of information while maintaining whatever information is programmed onto it indefinitely with no continued power requirements or electronics.

A further object of the invention is to provide a programmable electronic shelf tag which utilizes flexible plastic substrate in its fabrication to increase the durability and adaptability of the shelf tag for use in retail environments. As shelf tags are placed in environments such as supermarkets and shopping malls where they may be subjected to impacts, spills, dropped products or other things which could damage them, the use of flexible plastic material will provide durability in these environments. The shelf tag of the invention will thus reduce replacement costs for damaged shelf tags, adding to their cost effectiveness. The construction of the shelf tag also does not require any packaging, as the shelf tag is adaptable to snap into existing retaining devices associated with conventional merchandise shelving.

Another object of the present invention is to provide an apparatus for interfacing with the shelf tag in order to program new information into the display, with the apparatus supplying power and necessary control signals to reprogram the shelf tag. In a preferred embodiment, a hand-held apparatus is provided that can be easily used to program the shelf tag by simply entering desired information to be displayed via an input device such as a keypad, and interfacing the apparatus with the shelf tag to update display information. The ease of entering data and the versatility of the shelf tags decreases labor costs and allows information to be verified so any mistaken information erroneously entered onto the shelf tags can be changed immediately.

A further object of the present invention is to provide an apparatus and method for programming a shelf tag and a method of taking inventory and updating a shelf tag in an integrated manner via a micro cellular local area network (LAN). Such LAN's may use wireless communication from portable devices such as bar code readers to maintain and update a variety of product information. The present invention provides an apparatus for programming the shelf tag integrated with a data collection device for use in a micro cellular local area network, to allow information on prices, inventory and other types of data to. be instantly tracked, updated and changed, both in the LAN and on the shelf tag. The method of the present invention simplifies and integrates a larger number of tasks that are common in many businesses, further lowering operating costs by reducing labor.

This along with other objects and advantages of the present invention will become more readily apparent from a reading of the detailed description taken in conjunction with the drawings and the claims.

BRIEF DESCRIPTION OF THE DRAWINGS

FIG. 3 is an exploded perspective view of the shelf tag shown in FIG. 1.

FIG. 6A represents schematically a plurality of exemplary voltage wave forms used to switch the optical state of each character element of the bistable liquid crystal display shown in FIG. 1.

FIG. 9 is a system diagram of the components necessary to implement a method of taking inventory and updating price and other information via a radio frequency computer local area network. The system diagram includes a representation of a radio frequency computer local area network, a shelf tag and a portable tele-transaction computer equipped with an optical bar code reader wand and a shelf tag programming interface.

DETAILED DESCRIPTION OF THE PREFERRED EMBODIMENT

Figure 1:
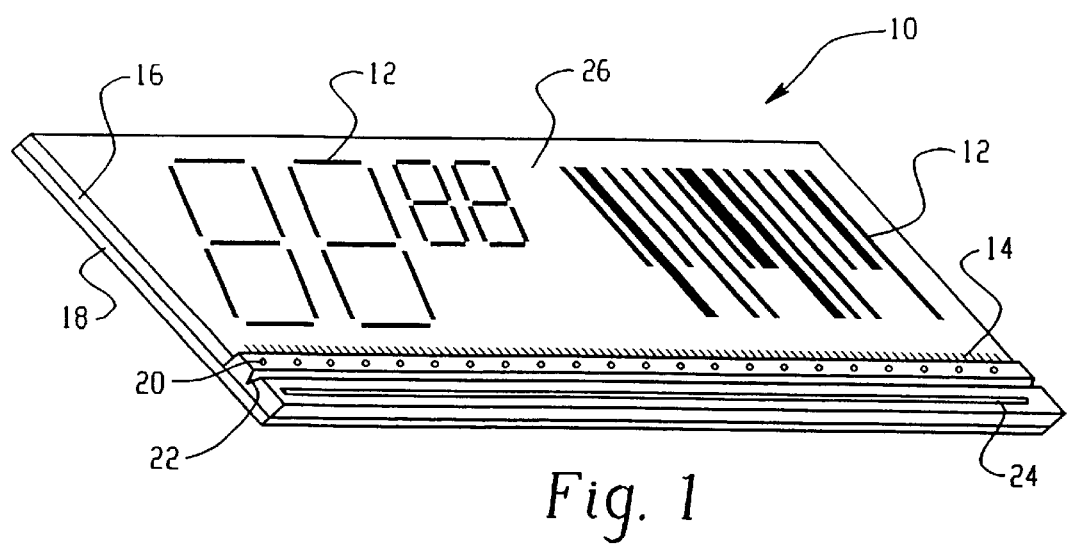
FIG. 1 is a perspective view of the shelf tag according to the preferred embodiment showing price display digits and bar code display digits.

Referring now to the drawings, a preferred embodiment of a shelf tag 10 according to the invention is shown in FIG. 1. The shelf tag 10 includes a liquid crystal display (LCD) comprised of a layer of liquid crystals, schematically shown at 26 sandwiched between a transparent surface 16 and a light absorbing (i.e., black) surface 18. The liquid crystal layer 26 is formed of liquid crystal material having first and second optical states which are both stable in the absence of an electric field. Formed in the liquid crystals display are individual character elements 12 used to generate numerals, alpha-numeric characters for lettering, bar codes and/or other characters or forms to be displayed. To program the character elements 12 between the first and second optical states, an interface to the character elements 12 includes a common contact 24 and a set of signal contacts 20. A programmer alignment track 22 may be used to guide a programming device linearly across the common contact 24 and the signal contacts 20. Printed or otherwise formed along the front of the transparent surface 16 are synchronizing indicators 14 which provide feedback to a programming device as to which character element 12 is to be programmed.

It should be recognized from the foregoing, that the shelf tag 10 provides a very simple structure which can be fabricated using flexible plastic substrates such as mylar film or other suitable flexible plastic materials. These materials are easily produced in the desired configuration and are extremely cost effective, to make a shelf tag 10 viable for large scale use in retail environments. Forming the shelf tag 10 of flexible plastic substrates also makes the shelf tag 10 compatible with common display shelving, wherein the shelf tag 10 can be bent slightly so as to snap into existing retaining devices already attached to such shelving. In this way, the shelf tag 10 will not require any external packaging, again enhancing its cost effective manufacture and use.

Figure 2A:
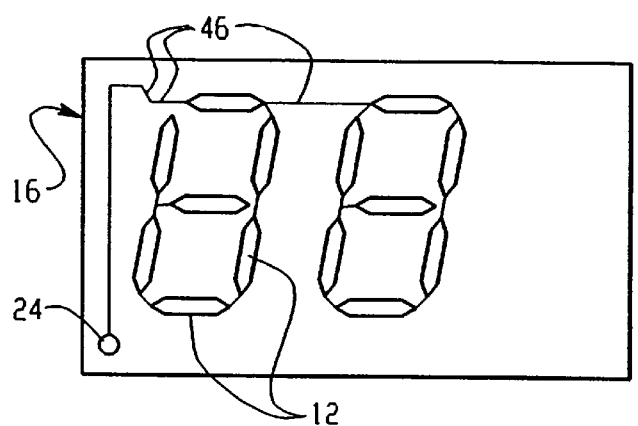
FIGS. 2A and 2B show plan views of front and back plates of the shelf tag shown in FIG. 1.
Figure 2B:
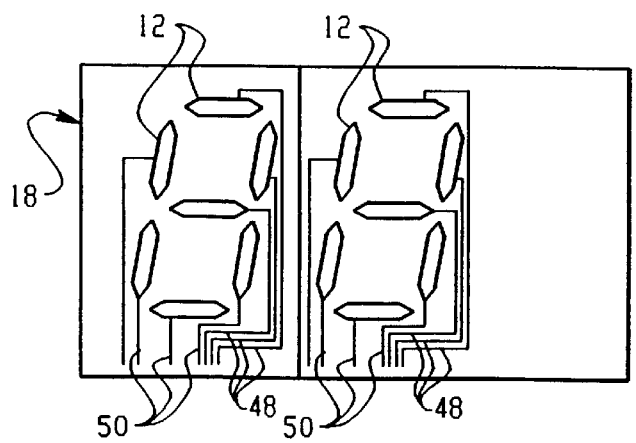

Turning to FIGS. 2A and 2B, the surfaces 16 and 18 forming a part of the shelf tag 10 shown in FIG. 1 are shown in a preferred embodiment thereof. In FIG. 2A, the front or top surface 16 of the shelf tag 10 is again preferably a transparent sheet of a plastic material having front and back surfaces, with the back surface having character elements as well as conductors preferably formed thereon. As an example, the mylar film or other suitable sheet of plastic material may be coated with a layer of indium tin oxide, which can then be etched to provide to provide the individual desired character or display elements 12 as well as to provide various conductor elements 46 and common conductor 24. In this particular embodiment, the character elements 12 are all connected to one another via a common conductor coupled to contact 24 and comprising the individual conductor elements 46. As shown in FIG. 2A, the character elements 12 may be positioned to form a common digital 8 configuration including 7 individual character elements, so as to enable display of pricing information. Alternatively, character elements 12 may be otherwise configured to display other desired information, such as alpha-numeric characters utilizing 11 similar character elements 12 in a known manner. Because the character elements 12 are easily formed by etching or similar process, any other display configurations for character elements 12 may be used in association with shelf tag 10. Referring back to FIG. 1, other display elements 12 can thus be used to make up a bar code configuration which can be formed in a similar manner.

In conjunction with a top surface 16 as shown in FIG. 2A, the bottom surface 18 is configured in a corresponding fashion, to match character elements 12 formed on the top sheet 16. As previously indicated with respect to FIG. 1, between top sheet 16 and bottom sheet 18, a layer of liquid crystal material 26 is formed, with character elements 12 formed on the bottom of sheet 16 and top of sheet 18 in matching relationship such that liquid crystal material 26 is disposed between each pair of character elements 12. The character elements 12 formed on bottom sheet 18 may also be etched from a coating of conductive material such as indium tin oxide to provide the individual desired elements 12, along with conductors 48 formed for each of the character elements 12 on bottom sheet 18. The conductors 48 are fed to a bottom side of sheet 18, and in turn form a set of individual contacts 50 used to interface with each of the individual character elements 12 formed on the top surface of sheet 18. In both FIGS. 2A and 2B, the character elements 12 as well as conductors 46 and 48 provide transparent electrodes applied to respective adjacent sides of plates 16 and 18, with corresponding electrodes forming character elements 12 on plates 16 and 18 used to impress an electric field across the liquid crystal material 26 disposed there between. The electric field is used to switch the optical states of the liquid crystal material 26.

The shelf tag 10 is constructed around the use of liquid crystal material 26 which have two optical states, both stable in the absence of any electric field. By injecting a polymeric stabilizer into the liquid crystals 26, two unenergized stable optical states are produced. The two optic states consist of a scattering or focal conic state, where light passes through the liquid crystal 26 to appear transparent, and a reflecting or planar state where light does not pass through the liquid crystal 26. The liquid crystal material 26 is therefore sandwiched between the transparent character elements 12 on which 16 coupled to common conductor 46 and character elements 12 on the back plate 18 coupled to individual conductors 48 for each character element 12. The back plate 18 could be formed as transparent reflective or opaque (i.e., black) or have its back surface provided with an opaque layer or coating. In operation when the optical condition of the liquid crystal 26 character elements 12 allows light to pass, the viewer sees the black surface formed on sheet 18, making the character element 12 appear dark. When the optical condition of the liquid crystal 26 does not allow light to pass, light entering from the transparent front plate 16 is reflected making the character element 12 appear light and virtually unreadable.

In a preferred embodiment of the shelf tag 10, the LCD display uses stabilized cholesteric liquid materials which exhibit bistable behavior. This liquid crystal material and application in an LCD is described in more detail in Cholesteric Liquid Crystal/Polymer GEL DISPERSION: Reflective Display Application (May 1992) SID Digest of Technical Papers, pp. 759–782, Cholesteric Reflective Display: Drive Scheme & Contrast (1992), Journal of Applied Physics, Vol. 64, No. 15, page 1905, and Control of Reflectivity & Bistability in Displays using Cholesteric Liquid Crystals (1994), Journal of Applied Physics, Vol. 76, No. 2, page 1331, each of which are expressly incorporated herein by reference in their entireties. In construction, the flexible substrate, being either front plate 16 or back plate 18 may be laminated with a layer of polymer stabilized cholesteric liquid crystal material 26. Subsequently, when plates 16 and 18 are then positioned adjacent one another to sandwich the. liquid crystal material 26 there between. Control signals may then be applied to the common contact 24 and individual ones of the signal contacts 20 to change the optical state of the bistable liquid crystal material 26 between either reflecting or scattering optical states to generate a desired display on the LCD. Control signals may be symmetrical wave forms providing an instantaneous voltage magnitude across a particular character element defined by the etched transparent conductors forming the character elements on the top and back plates 16 and 18 respectively, so as to change the optical state of the liquid crystal material 26 for that character element 12. The individual signal contacts 20 and associated conductors 46 in conjunction wit the common contact 24 and corresponding conductor 48 allow any of the individual character elements 12 to be changed from the reflecting or scattering optical states accordingly.

In order to easily interface a programming device to the shelf tag 10, the set of signal contacts 20, and common contact 24 are used. In a preferred embodiment as shown in FIG. 3, the common contact 24 may be interfaced by means of a nonconductive strip 56, preferably plastic, which can easily be configured with an alignment track 22 molded or cut in the shape of a groove running the length of the strip 56. Below the alignment track 22 is an electrical conductor 40 embedded into the strip 56 and exposed on the top of strip 56 to provide an interface for coupling reference signals to the common contact 24. At one end of the strip 56, the electrical conductor 40 is disposed through strip 56 to allow a connection of conductor 40 from the bottom side of strip 56. On one end of the strip 56, an extension arm 42 extends outward, with extension arm 42 having an electrical conductor 44 embedded in it which is exposed on one side of the extension arm 42. The Electrical conductor 44 is coupled to the electrical conductor 40 in the strip 56, and in turn is electrically coupled to the common contact 24 upon being assembled in shelf tag 10. To interface to the individual signal contacts 2 and to conductors 48 of each character element 12, a set of individual conductors 52 may be formed in an elongated nonconductive strip 54 so that the individual conductors 52 pass through both sides of the strip 54. Conductors 52 are coupled to individual signal contacts 20 upon assembly of the strip 54 with tag 10 as will be described hereinafter.

As seen in FIG. 3, the back plate 18 is wider than the front plate 16 to expose contacts 20 beyond front plate 16. Similarly, the length of front plate 16 allows common contact 24 to be exposed beyond back plate 18 when the plates are positioned adjacent one another. When connecting the components that make up the shelf tag 10, the back plate 18 provides a base which all other components will be stacked on and attached to by methods common in the art such as adhesives. The strip 56 with the extension arm 42 attached is placed on the back plate 18 along its lower front edge 58, such that conductor 44 connects to common contact 24 in turn connecting contact 24 to strip conductor 40. Strip 54 with conductors 52 is positioned adjacent strip 56 with each of conductors 52 connecting to an individual contact 20. The transparent front plate 16 is placed on top of the back plate 18. Each individual conductor 52 is aligned with and electrically coupled to each corresponding contact 20 completing the interface path from the individual conductors 52 to the individual contacts 20 and to each conductor of each character element 12. In this manner, each of the individual contacts 20 is electrically accessible by means of conductors 52 at a position exterior to the shelf tag 10 while providing a compact shelf tag construction. Similarly, the common contact 24 is electrically coupled to the strip conductor 40 which is easily accessible adjacent each of the individual conductors 52, such that each of the common and individual contacts 24 and 20 respectively can be fed data signals generated by a programming device at an easily accessible position on the shelf tag 10.

Figure 4:
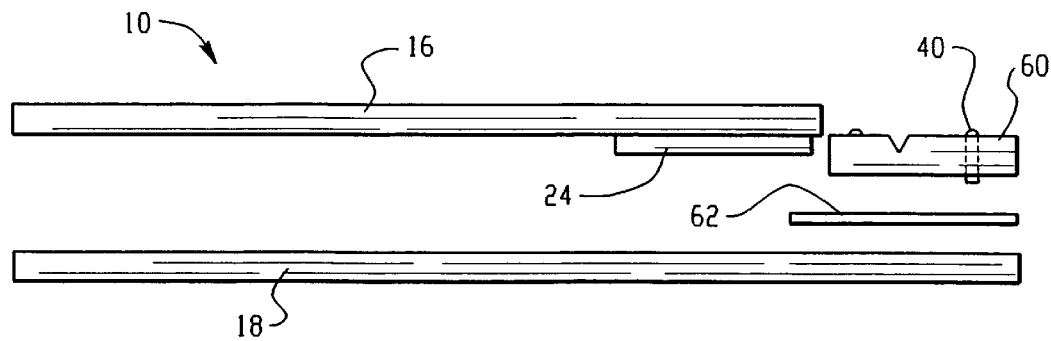
FIG. 4 is a side elevational exploded view of an alternative embodiment of the shelf tag shown in FIG. 1.

In an alternative embodiment of the shelf tag 10, as shown in FIG. 4, a combined contact strip and guide 60 is used to replace the combination of a nonconductive strip 56 and extension arm 42 as shown in FIG. 3. A conductive adhesive 62, such as a z-axis conductive adhesive, may be placed on the back plate 18 along its lower front edge or at a similar relative location, such that upon joining of the front plate 16 and back plate 18, the conductive adhesive 62 electrically couples common contacts 24 with strip conductor 40. the arrangement of individual conductors 52 may be configured in a manner similar to that shown in FIG. 3 to be electrically coupled to contacts 20. This combination allows for simpler production of the shelf tag and fewer components which both add cost savings to the shelf tag. Other suitable arrangements for electrically coupling the common and individual contacts of the shelf tag to be accessible exterior to the shelf tag 10 are also contemplated in the invention.

The set of synchronizing indicators 14 are printed or otherwise formed into the front plate 16 along its lower edge running lengthwise. In the preferred embodiment, these synchronizing indicators 14 will be read optically to provide a programming device with feedback as to which character element 12 it is coupled with, to correctly program the individual character elements 12 for display of desired information via the LCD. In the preferred embodiment, the synchronizing indicators 14 may assume a similar configuration to that of a bar code using a plurality of dark and light areas. A typical bar code reader and decoder arrangement is described in U.S. Pat. No. 4,104,514, which is hereby incorporated by reference herein as a suitable arrangement for configuring the synchronizing indicators 14 in a bar code format to be read and decoded in a similar manner. Conventionally, the dark areas are referred to as bars, while the light areas are referred to as spaces. Information typically is carried in the width of the bars as well as the width of the spaces along with their relationship to one another. Generally, an optical signal is generated by admitting light onto the series of bars and spaces, and receiving via an optical detector reflected light from the surface. An analog wave form representing the bar/pattern is generated by the optical detector and is digitized, wherein a bar may be represented by a "One" value and a space represented by a "Zero". The synchronizing indicators 14 may then be similarly read by relative movement of the indicators 14 relative to the optical reader. The sequence of bars and spaces, referred to as elements, are then read with the width of each element being a multiple of a standard dimension called a module. In most bar codes, elements are from 1–3 modules wide, with the character set representable by the bar code and the number of elements per character are varying from one symbology to another. Any bar code configuration may therefore be useable in the present invention, with conventional bar code readers also usable in conjunction with the invention. The synchronizing indicators 14 may include a preamble section which will indicate the beginning and set the format for scanning and reading the synchronizing indicators 14. The preferred embodiment uses optics to synchronize the programming device but other devices such as mechanical or electrical contacts could be used to provide pulse or count information indicative of the position of contacts associated with each character element 12.

Figure 5:
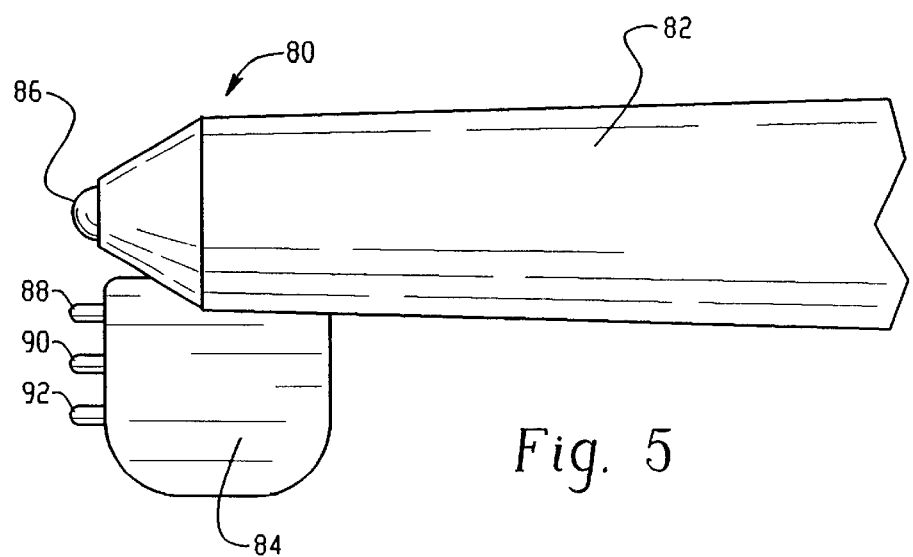
FIG. 5 is magnified side elevational view of an optical bar code reader wand with a shelf tag programming interface.
Figure 6B:
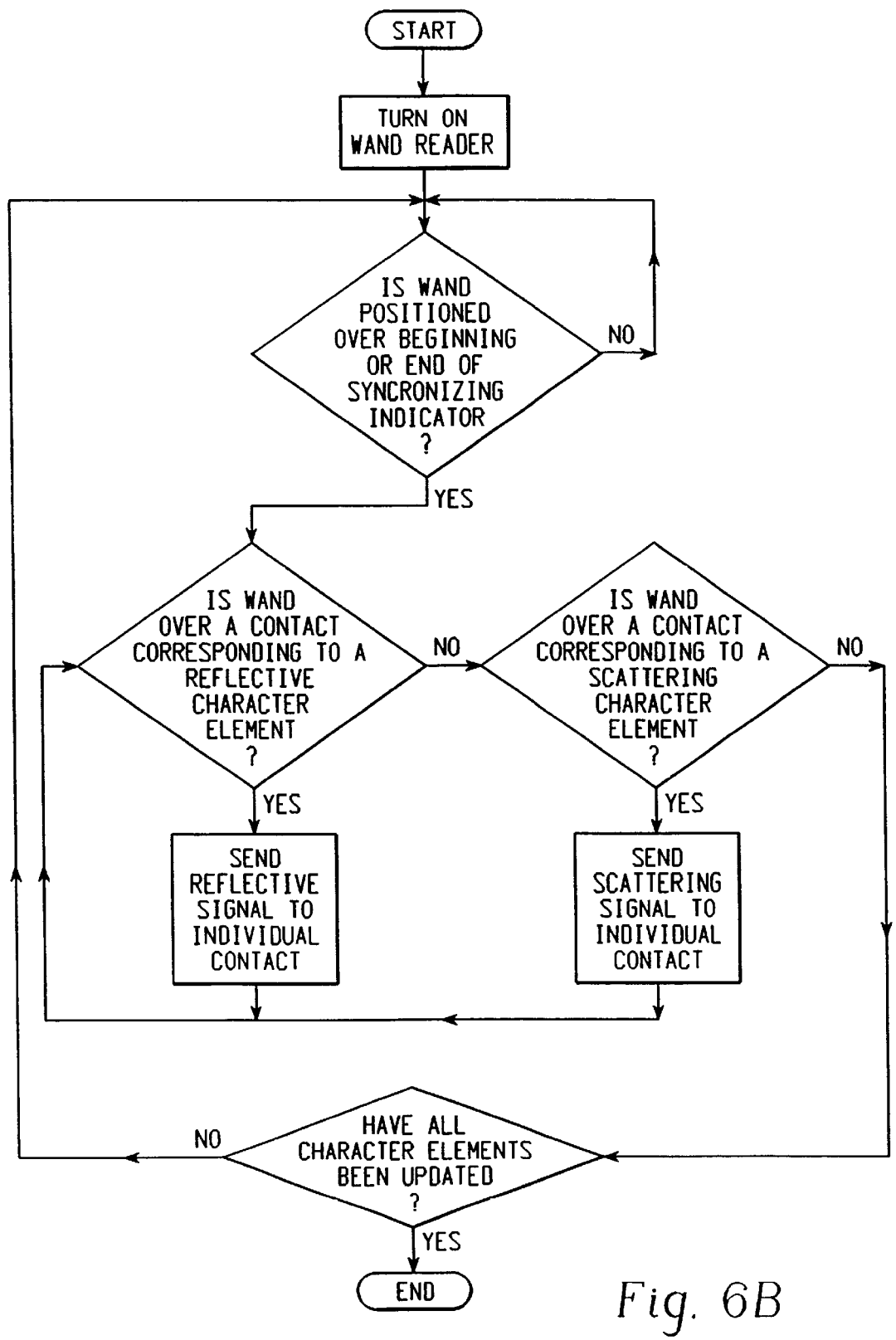
FIG. 6B is a flow chart indicating a typical sequence for programming a shelf tag.

A first preferred embodiment of a programming device 200 used to change the shelf tag's 10 display is shown in FIG. 9. The programming device 200 is a portable tele-transaction computer capable of sending and receiving information via radio frequency carrier signals, accepting user input via a keypad and reading bar code information and outputting shelf tag 10 programming data. Referring to FIG. 5, to perform the programming of the shelf tag 10, an optical bar code reader wand 80 with a programming interface 84 for use with shelf tag 10 may be used. The preferred embodiment of the wand 80 has a pen-shaped elongated body 82 typically fabricated from plastic or metal with an optical sensor 86 provided in the tip of the body 82. Below the optical sensor 86 the programming interface 84 is mounted to the body 82. Extending from and securely mounted to the programming interface 84 is the individual output pin 88, the alignment pin 90 and the common output pin 92. Also in the preferred embodiment, the use of alignment track 22 on tag 10 allows proper positioning of output pins 88 and 92 in conjunction with an alignment pin 90. The alignment pin 90 is only used for mechanical alignment of the interface 84 with tag 10. The alignment pin 90 is placed by the user in the programmer alignment track 22 of the shelf tag 10. By keeping the alignment pin 90 in the track 22 the user can sweep across the common contact 24 and the set of signal contacts 20 in an even and linear manner. It should be noted that the alignment pin 90 and track 22 are for the users benefit but neither is necessary to the programming of the shelf tag 10. All that is needed is a proper connection of the output pins 88 and 92 and the signal contacts 20 and the common contact 24 respectively. FIG. 6A shows an example of the relationship between the signals emitted through the common output pin 92 and the individual output pins 88 used to change the optical state of character elements 12. The common output pin 92 provides a ground reference to the common contact 24. To maintain a reflective optical state on the character element 12, the individual output pin 88 also emits a wave form symmetrical about zero with a peak to peak magnitude of $V_H$ as shown in FIG. 6A. To change the character element 12 from the reflective optical state to a scattering state, the same common signal should be output from the common output pin 92 and the individual output pin 88 should follow the wave form shown in FIG. 6A for a scattering optical state which is a symmetrical wave form of $V_L$ wherein $V_L$ is the voltage necessary to change to scattering. It should be noted that both the reflective and scattering wave forms differ in magnitude. The optical sensor 86, the individual output pin 88 and the common output pin 92 are all electrically coupled to the programming device 200 by wires running through the body 82 of the wand 80 and back to the programming device 200. A typical sequence of steps for programming a shelf tag 10 are shown in the flow chart of FIG. 6B. The sequence may begin by turning the optical sensor 86 of the wand 80 on. The programming device 200 will then determine whether the wand is positioned over the beginning or the end of the synchronizing indicators 14. If not, the program will loop back and continue to check whether the wand 80 is positioned over the beginning or end of the synchronizing indicators 14. Once the wand 80 is positioned correctly the programming device 200 will determine if the wand 80 is over a signal contact 20 corresponding to a character element 12 that is to be programmed to a reflective optical state. If it is, the programming device 200 will send a reflective signal to pin 88 to cause the character element 12 to take on a reflective state. Alternatively, If the wand is over a contact for a character element to be updated to a scattering state, this is determined in a next processing step, and a corresponding scattering signal is sent to the individual output pin 88. The programming device will loop back and repeat the above sequence until it is determined if all character elements 12 have been updated. If so, the program will end and if not, the program will loop back and determine if the wand 80 is positioned over the beginning or end of the synchronizing indicators 14.

Figure 7:
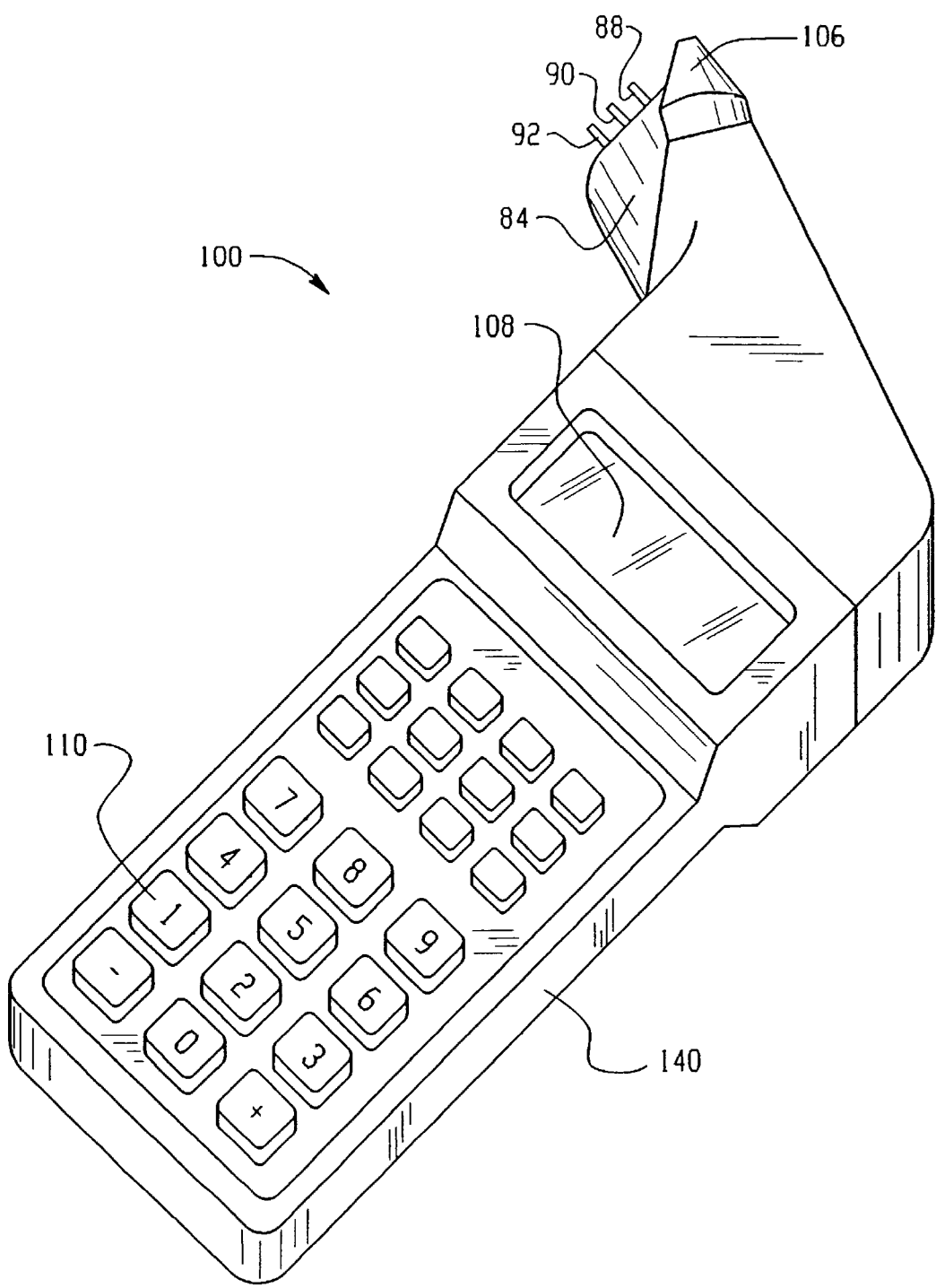
FIG. 7 is a perspective view of a stand-alone shelf tag programming device.
Figure 8:
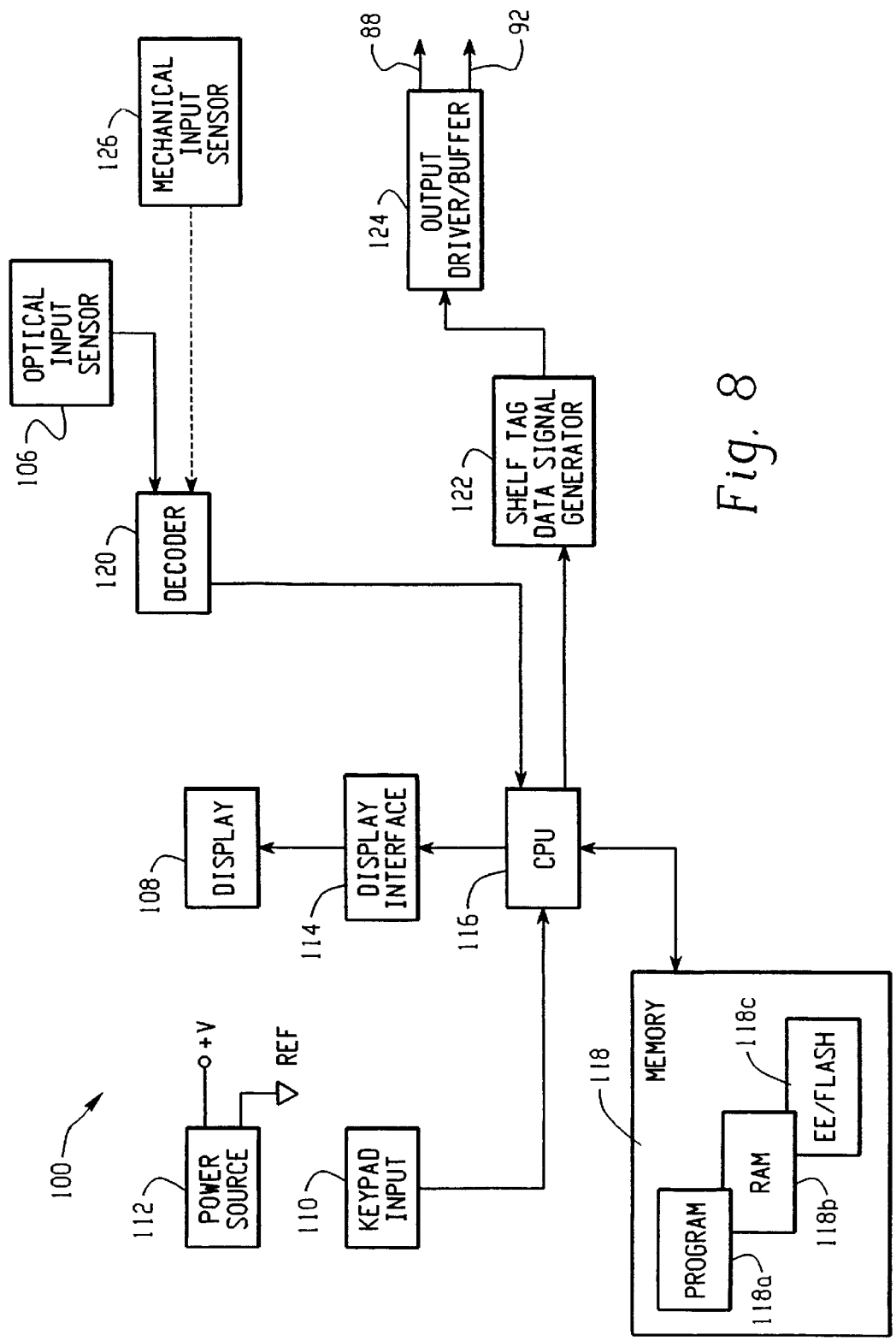
FIG. 8 is a block diagram of the circuitry the stand-alone shelf tag programming device shown in FIG. 7 comprises.

Although the preferred embodiment of the programming device 200 is the portable tele-transaction computer, such as that depicted in FIG. 9, an alternate embodiment is shown in FIGS. 7 and 8. A hand-held stand-alone programmer 100 is shown in FIG. 7 which incorporates a small, easily handled housing 140 preferably manufactured from durable hardened plastic or rubber. The programmer may include a keypad 110 for user input to be programmed into the shelf tags 10, or another input mechanism may be provided. Optionally the programmer 100 may include an electronic display 108 to prompt and view user input. A fixed optical sensor 106 for synchronizing programmer 100 with tag 10 may again be provided, or suitable alternative arrangements.

The programming interface 84 as shown in FIG. 5 again may comprise an alignment pin 90, an individual output pin 88 and a common output pin 92. FIG. 8 depicts the standalone programmer 100 in functional block diagram format. A central processing unit or CPU 116 performs all of the data input and output control and manipulation. The CPU 116 reads the program memory 118*a* for operation. The CPU 116 uses the random access memory or RAM 118*b* for manipulating data and as an option it may use nonvolatile memory 118*c* (EEPROM, FLASH, NOVRAM) to maintain user setpoints or database information which needs to be retained when power is not applied. The CPU 116 receives user input from the keypad 110 or other input device, and displays information for the user by sending data to the display interface 114 which then controls how the display 108 outputs the data. The optical sensor 106 transforms light into data which is then sent to a decoder 120 which prepares the data into the proper digital format for use by the CPU 116. An alternate option for use with a mechanical synchronization mechanism is a mechanical input sensor 126 which would translate mechanical movement into data for use by the CPU 116. Data to be programmed into the shelf tag 10 is sent from the CPU 116 to the shelf tag data signal generator 122 which converts the digital information into the proper format needed for changing the character elements 12 on the shelf tag 10. The formatted data is then transmitted to an output driver/buffer 124 in order to output data through the individual output pin 88 and the common output pin 92. Power is supplied to all circuitry by power source 112 which will typically be a battery, preferably rechargeable. Power could be supplied by other sources such as AC/DC adapters, solar power cells or other sources of electrical power. It should be understood that the above description of the circuitry is only illustrative, many functions can be accomplished in different electronic means, for example many display devices have display interface circuitry incorporated into them and many CPUs have different types of memory integrated into a single chip. The functions represented can therefore be electronically implemented in many different ways by someone of ordinary skill in the art.

In the course of normal operation, the stand-alone programmer 100 and the programming device 200 will be coupled by the user to the shelf tag 10 by placing the programming interface 84 adjacent shelf tag 10, and particularly with alignment pin 90 in the programmer alignment track 22 of the shelf tag 10. The programming interface 84 is swept across tag 10, either in the form of the wand 80 or the stand-alone alone programmer 100, from one side of the shelf tag 10 to the other in a linear fashion. The individual output pin 88 will be electrically coupled to each individual conductor 52 of the set of signal contacts 20 in turn during this sweeping action, and the common output pin 92 will be electrically coupled to the electrical conductor 40 of the common contact 24 at all times. As the programming interface 84 is moved from across the shelf tag 10 either the optical sensor 86, the optical input sensor 106 or the mechanical input sensor 126, will read the synchronizing indicators 14 on the front of the shelf tag 10 and supply the stand-alone programmer 100 or the programming device 200 with data relating to which character element 12 the programming interface 84 is currently coupled to for proper programming. Next the proper data signals are output to the shelf tag 10 and the desired character elements 12 are changed. As previously indicated, the synchronizing indicators 14 may include information stored in a preamble section of the synchronizing pattern to be used to differentiate among different shelf tag formats which are possible. The invention is therefore not limited to any particular configuration or format, with the shelf tags 10 themselves potentially of a variety of configurations to display any variety of information with the display on the tag not fixed to any single format. The information stored in the preamble section of the synchronizing pattern 14 may therefore be used to differentiate among various shelf tag formats, with the programming interface 84 adapting to any such configuration.

Referring to FIG. 9, as a possible application of the invention, a plurality of shelf tags 10 will be placed on shelves near products and the shelf tag 10 will display the products price and a corresponding UPC bar code. The shelf tags 10 will be used in conjunction with a programming device 200 such as a portable tele-transaction computer (PTC) equipped with an optical bar code reader wand 80 having a shelf tag 10 programming interface 84. The PTC will be equipped with radio frequency communication capabilities that will allow it to communicate throughout the application site (i.e., a store or supermarket) with a radio frequency computer local area network (LAN) 150. The LAN 150 would be connected to at least one computer server 154, at least one computer work station 156 and at least one computer controller 152. As a store clerk is using the PTC to take inventory through the use of scanning bar codes on products or by scanning bar codes on the shelf tags 10, the PTC would communicate packets of data to the controller 152 via radio frequency. The controller 152 would then transfer the inventory data to the server 154 and/or work station 156 where the data would be processed. If the computer determines that a price needs to be changed for a particular product, the work station 156 or server 154 would direct the controller 152 to send packets of information to the PTC or programming device 200 via radio frequency. The information sent to the programming device 200 would contain a message that a particular products price needed to be changed and update information relating thereto. Once the programming device 200 receives the packets of information it would signal the user, either visually with an indicator light or message prompt, or through an audio tone or both. The user would then know to use the programming interface 84 to change the information displayed by the shelf tag 10. This type of system application would save a great deal of time and paper work while providing for greater accuracy by taking the task of properly updating shelf tag information out of the hands of store clerks who are human and are prone to make mistakes.

While the foregoing description is set forth the preferred embodiments of the invention with particular detail, it must be understood that numerous modifications, substitutions or changes may be undertaken without departing from the true spirit and scope of the present invention as defined in the following claims.

Having thus described the invention, it is now claimed:

1. An electronic shelf tag system comprising:
   an electronic shelf tag including a display means for displaying at least one of either pricing data or product identification data;
   a computer system for storing and communicating programming data;
   a portable programming device for receiving programming data from said computer system, wherein said programming device programs the electronic shelf tag in accordance with the programming data received from the computer system, and said programming device programming the electronic shelf tag by transmitting display data signals to the electronic shelf tag.

2. An electronic shelf tag system according to claim 1, wherein said programming device includes communication means for wireless communications.

3. An electronic shelf tag system according to claim 1, wherein said programming device includes first communications means for wireless communications with said electronic shelf tag.

4. An electronic shelf tag system according to claim 3, wherein said programming device includes second communications means for wireless communications with said computer system.

5. An electronic shelf tag system according to claim 1, wherein said programming device includes:
   processing means for controlling data input and output; and
   memory means for storing control programs for controlling operation of said programming device.

6. An electronic shelf tag system according to claim 5, wherein said programming device further includes:
   input means for allowing a user to input programming data to said programming device; and
   a display unit for displaying programming data.

7. An electronic shelf tag system according to claim 1, wherein said programming device is a portable tele-transaction computer.

8. An electronic shelf tag system according to claim 1, wherein said programming device is a hand-held programming device.

9. An electronic shelf tag system according to claim 1, wherein said programming device receives product identification data from said electronic shelf tag, said programming device transmitting the received product identification data to said computer system, and receiving programming data from said computer system in accordance with the product identification data transmitted thereto.

10. An electronic shelf tag system according to claim 9, wherein said product identification data includes bar code data for identifying a product associated with said electronic shelf tag.

11. An electronic shelf tag system according to claim 1, wherein said computer system includes storage means for storing pricing data and product identification data.

12. An electronic shelf tag system according to claim 1, wherein said computer system includes a local area network (LAN).

13. A method for programming an electronic shelf tag, comprising:
   storing product data in a remote storage means;
   transmitting the product data from the remote storage means to a portable programming means; and
   transmitting programming signals from said portable programming means to said electronic shelf tag to update product display information displayed by said electronic shelf tag, the electronic shelf tag having a plurality of character elements, and the step of transmitting programming signals to said electronic shelf tag includes individually programming each character element via an individual conductor associated with each character element.

14. A method according to claim 13, wherein said product data includes product pricing data and product identification data.

15. An electronic shelf tag system comprising:
   a computer system for storing and communicating programming data representative of at least one of either pricing data or product identification data; and
   a data communications means for receiving the programming data from said computer system, wherein said data communication means includes means for communicating said programming data to an electronic shelf tag for generation of a visual display therefrom, wherein the data communications means includes a portable programming device and the electronic shelf tag has a plurality of character elements, each character element coupled to an individual conductor, and display data for each character element being transmitted from the programming device to each character element via the individual conductor associated with the character element.

16. An electronic shelf tag system according to claim 15, wherein said data communication means includes means for wireless communications.

17. An electronic shelf tag system according to claim 15, wherein said data communication means includes:
   processing means for controlling data input and output; and
   memory means for storing control programs for controlling operation of said programming device.

18. An electronic shelf tag system according to claim 17, wherein said data communication means further includes:
   input means for allowing a user to input programming data to said data communication means; and
   a display unit for displaying programming data.

19. An electronic shelf tag system according to claim 15, wherein said data communication means is a portable tele-transaction computer.

20. An electronic shelf tag system according to claim 15, wherein said data communication means is a hand-held programming device.

21. An electronic shelf tag system according to claim 15, wherein said data communication means receives product identification data from said electronic shelf tag, said data communication means transmitting the received product identification data to said computer system, and receiving programming data from said computer system in accordance with the product identification data transmitted thereto.

22. An electronic shelf tag system according to claim 21, wherein said product identification data includes bar code data for identifying a product associated with said electronic shelf tag.

23. An electronic shelf tag system according to claim 15, wherein said computer system includes storage means for storing pricing data and product identification data.

24. An electronic shelf tag system according to claim 15, wherein said computer system includes a local area network (LAN).

25. An electronic shelf tag system according to claim 15, wherein said electronic shelf tag includes display means having liquid crystal material, said liquid crystal material having a first optical state and a second optical state, wherein the first and second optical states are stable in the absence of an electric field.

26. The electronic shelf tag system according to claim 1, wherein the display data signals consist of liquid crystal state information.

27. The electronic shelf tag system according to claim 1, wherein the electronic shelf tag has a plurality of character elements, each character element coupled to an individual conductor, and display data for each character element being transmitted from the programming device to the character element via the individual conductor associated with the character element.

28. The electronic shelf tag system according to claim 27, wherein the electronic shelf tag has at least one synchronizing indicator for providing positioning information to the programming device.

29. The electronic shelf tag system according to claim 1, where the display data signals are transmitted to the associated electronic shelf tag by temporally establishing a physical connection between the programming device and the associated electronic shelf tag.

30. The electronic shelf tag system according to claim 29, wherein the physical connection is made between at least one electrical connector disposed on the programming device and at least one electrical connector disposed on the electronic shelf tag.

31. The method according to claim 13, wherein the programming signals transmitted to the electronic shelf tag are without address data used to distinguish the electronic shelf tag from a plurality of electronic shelf tags.

32. The method according to claim 31, wherein the programming signals transmitted to the electronic shelf tag consist of liquid crystal state information.

33. The method according to claim 13, further comprising the step of reading a synchronizing indicator disposed on the electronic shelf tag with the portable programming means to provide positioning information to the portable programming means.

34. The method according to claim 13, wherein the step of transmitting programing signals to the electronic shelf tag includes temporarily establishing a physical connection between the portable programming means and the electronic shelf tag.

35. The method according to claim 34, wherein the physical connection is made between at least one electrical connector disposed on the portable programming means and at least one of the individual conductors.

36. The electronic shelf tag system according to claim 15, wherein the display data consist of liquid crystal state information.

37. The electronic shelf tag system according to claim 15, wherein the electronic shelf tag has at least one synchronizing indicator for providing positioning information to the programming device.

38. The electronic shelf tag system according to claim 15, where the display data is transmitted to the associated electronic shelf tag by temporally establishing a physical connection between the programming device and the associated electronic shelf tag.

39. The electronic shelf tag system according to claim 38, wherein the physical connection is made between at least one electrical connector disposed on the programming device and at least one of the individual conductors.

* * * * *